(12) United States Patent
Hirai et al.

(10) Patent No.: US 8,593,631 B2
(45) Date of Patent: Nov. 26, 2013

(54) SPECTRAL IMAGE ACQUIRING APPARATUS

(75) Inventors: Hideaki Hirai, Kanagawa (JP);
Masanori Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 13/275,572

(22) Filed: Oct. 18, 2011

(65) Prior Publication Data

US 2012/0105843 A1    May 3, 2012

(30) Foreign Application Priority Data

Oct. 27, 2010  (JP) ................. 2010-241074

(51) Int. Cl.
*G01J 3/40* (2006.01)
*G01J 3/45* (2006.01)
*G01B 9/02* (2006.01)

(52) U.S. Cl.
USPC ........................ 356/305; 356/456; 356/521

(58) Field of Classification Search
USPC ........................ 356/456, 571, 300–334, 521
See application file for complete search history.

(56) References Cited

U.S. PATENT DOCUMENTS

| | | | |
|---|---|---|---|
| 4,998,798 A * | 3/1991 | Ishizuka et al. ............... | 359/437 |
| 5,020,910 A | 6/1991 | Dunn et al. | |
| 5,210,400 A | 5/1993 | Usami | |
| 5,731,874 A * | 3/1998 | Maluf ........................... | 356/326 |
| 5,812,629 A * | 9/1998 | Clauser .......................... | 378/62 |
| 7,219,086 B2 * | 5/2007 | Geshwind et al. ............. | 706/20 |
| 2007/0086017 A1 * | 4/2007 | Buckland et al. ............. | 356/497 |
| 2009/0315993 A1 | 12/2009 | Hirai | |

FOREIGN PATENT DOCUMENTS

| | | |
|---|---|---|
| JP | 2005-31007 | 2/2005 |
| JP | 2005-57541 | 3/2005 |
| JP | 2010-25915 | 2/2010 |
| WO | WO 2005/072363 A2 | 8/2005 |
| WO | WO 2005/072363 A3 | 8/2005 |

OTHER PUBLICATIONS

Extended European Search Report issued Feb. 1, 2012, in Patent Application No. 11186131.6.
Donghyun Kim, et al., "Design of a grating-based thin-film filter for broadband spectropolarimetry", Applied Optics, vol. 42, No. 31, XP 55016749, Nov. 1, 2003, pp. 6321-6326.
"Optical Alliance", Japan Industrial Publishing Co., Ltd., (with partial English translation), Nov. 1999, 7 pages.

* cited by examiner

*Primary Examiner* — Tarifur Chowdhury
*Assistant Examiner* — Sunghee Y Gray
(74) *Attorney, Agent, or Firm* — Oblon, Spivak, McClelland, Maier & Neustadt, L.L.P.

(57) ABSTRACT

A spectral image acquiring apparatus includes an optical filter on which light is incident; an image sensor including a two-dimensionally disposed pixel array for detecting the light via the optical filter; and a signal processing unit generating a difference-value image based on a detection signal from the image sensor. The optical filter includes a diffraction grating having a lattice pattern corresponding to one or more pixels on the image sensor. The signal processing unit calculates a difference value in an amount of received light between two adjacent pixels based on the detection signal from the image sensor, and generates the difference-value image based on the difference value. The difference value between the two adjacent pixels is varied depending on a difference in an interference point on the image sensor corresponding to a diffraction angle of the light that has passed through the diffraction grating.

14 Claims, 13 Drawing Sheets

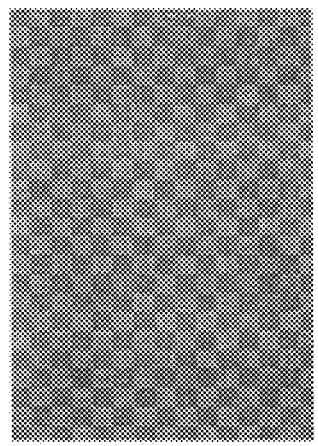
FIG.12C 650nm
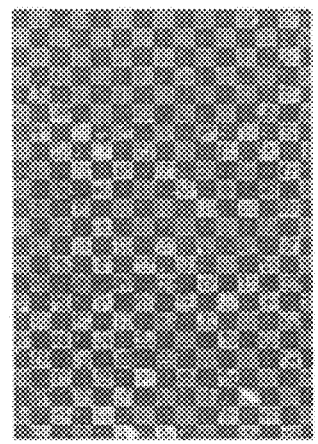
FIG.12B 550nm
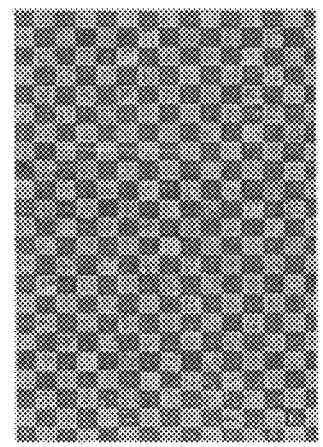
FIG.12A 450nm

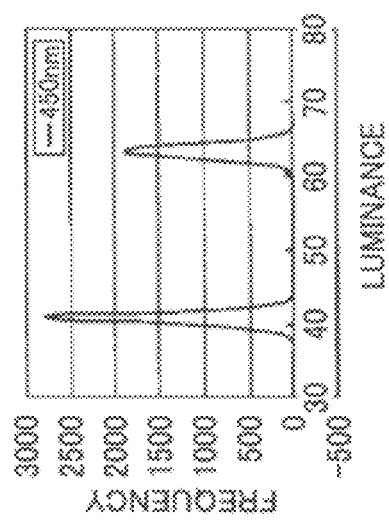
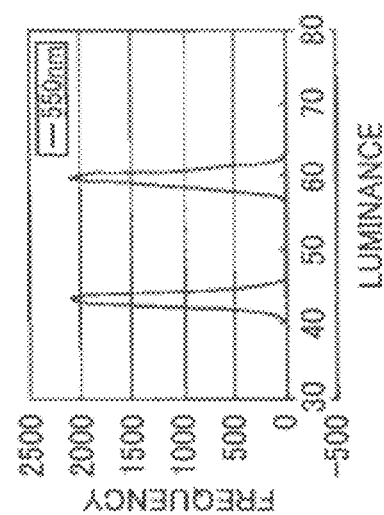
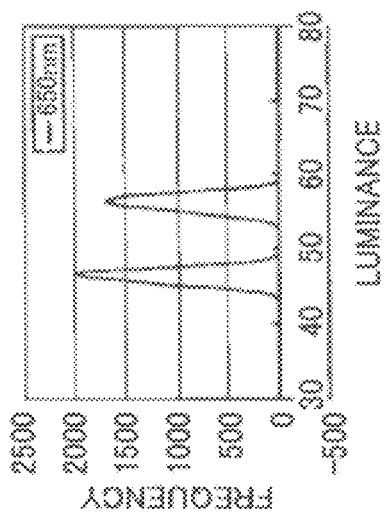

SPECTRAL IMAGE ACQUIRING APPARATUS

BACKGROUND

1. Technical Field

The disclosure discussed herein generally relates to a spectral image acquiring apparatus for acquiring a spectral image.

2. Description of the Related Art

Spectroscopes are widely used for acquiring optical spectra. Typically, a spectroscope separates incoming light into plural wavelength components by using a prism or a diffraction grating, and detects the optical intensity of the wavelength components with a light-receiving element. However, such a general-purpose spectroscope cannot acquire an optical spectrum of the incoming light in association with positional information of the incoming light.

In recent years, much attention has been focused on a spectral image acquiring apparatus capable of acquiring a spectral image that two-dimensionally represents wavelength components of light from various points within a predetermined imaged area in association with the various points. The acquired spectral image represents a two-dimensional distribution of the wavelength components of the various points in the imaged area. For example, the spectral image represents the wavelength components of the various points within the imaged area by gradational differences.

Methods for acquiring spectra may be categorized into three types; namely, one employing a wavelength selective filter (such as a bandpass filter, a low-pass filter, or a high-pass filter); one employing a dispersive element such as a prism or a diffraction grating; and another using Fourier spectroscopy. Various spectral image acquiring apparatuses employing such methods have been proposed.

As an example of the apparatus capable of acquiring a spectral image by using a wavelength selective filter, Japanese Laid-open Patent Publication No. 2005-57541 discusses a spectroscopic camera head. In this spectroscopic camera head, incoming light from a subject is received by a two-dimensional imaging element via a wavelength selective filter configured to provide a spectral image of a wavelength component corresponding to the wavelength selective filter. The spectroscopic camera head can dynamically switch transmission wavelengths by using a liquid crystal wavelength-tunable filter as the wavelength selective filter. Thus, by imaging a subject by switching the transmitted wavelength of the wavelength selective filter, plural images with different wavelength components can be obtained. By composing such images, a spectral image that two-dimensionally represents the wavelength components of various points in the imaged area in association with the various points can be acquired.

As an example of the apparatus capable of acquiring a spectral image by using a dispersive element, "Optical Alliance", JAPAN INDUSTRIAL PUBLISHING CO., LTD., November 1999, pp. 4-9 discusses a planar spectrometer. The planar spectrometer includes an imaging spectroscope capable of simultaneously measuring positional information and spectral information of points located on a straight line. By performing imaging while scanning the imaging spectroscope in a direction perpendicular to the direction in which the points are arranged, a spectral image can be obtained in which the wavelength components of the points within the imaged area are two-dimensionally represented in association with the points.

As an example of the imaging apparatus using Fourier spectroscopy, Japanese Laid-open Patent Publication No. 2005-31007 discusses a spectrometer apparatus that separates incoming light into two optical paths or polarization components. A phase difference is provided to one of the two optical paths or polarization components so as to cause the two optical paths or polarization components to interfere with each other. A resultant detection signal is Fourier-transformed by a computer in order to obtain an optical spectrum. When a spectral image is to be obtained by using the spectrometer apparatus, the phase difference given to the two perpendicular optical paths or polarization components is changed during detection. In this way, a two-dimensional distribution of an optical spectrum can be obtained in a predetermined wide range of wavelengths.

However, it takes a long processing time before a spectral image can be obtained by any of the above methods. Thus, the methods cannot be easily applied for applications for acquiring a spectral image on a real-time basis at high speed.

Specifically, in the method using the wavelength selective filter, the two-dimensional distribution can be obtained only with respect to one wavelength component by a single imaging operation. In order to obtain a spectral image, plural images may be acquired by using different wavelength components and then composing the images. However, this method takes a long time because of the need for the multiple imaging operations and the process of composing the multiple images, resulting in a long processing time for obtaining the spectral image.

In the method using the dispersive element, in order to obtain a spectral image, imaging is performed while scanning the imaging spectroscope, so that the process time for obtaining the spectral image is extended by the scanning time.

In the method using Fourier spectroscopy, in order to obtain a spectral image, detection is performed while changing the phase difference given to the two optical paths or polarization components, so that the time for obtaining the spectral image is extended by the time for detection.

SUMMARY OF THE INVENTION

In view of the foregoing problems of the related art, it is a general object of embodiments of the invention to provide a spectral image acquiring apparatus capable of acquiring a spectral image in a short processing time.

In one aspect, there is provided a spectral image acquiring apparatus that includes an optical filter on which light from an imaged area is incident; an image sensor including a two-dimensionally disposed pixel array and configured to detect the light via the optical filter and configured to output a detection signal; and a signal processing unit configured to process the detection signal from the image sensor and configured to generate a difference-value image based on the detection signal. The optical filter includes a diffraction grating having a lattice pattern corresponding to unit areas on the image sensor, the unit areas including one or more pixels. The signal processing unit calculates a difference value in an amount of received light between two of the unit areas that are adjacent to each other based on the detection signal from the image sensor, and generates the difference-value image based on the difference value. The difference value between the two adjacent unit areas is varied depending on a difference in an interference point on the image sensor corresponding to a diffraction angle of the light that has passed through the diffraction grating.

BRIEF DESCRIPTION OF THE DRAWINGS

FIGS. 12A, 12B, and 12C illustrate enlarged views of a part of acquired images output from a signal processing unit when three single wavelengths of light (450 nm, 550 nm, and 650 nm) were incident according to Process 1 for generating a spectral image;

FIGS. 13A, 13B, and 13C are histograms of the amount of light (luminance value) received at the pixels on the image sensor where the three single wavelengths of light (450 nm, 550 nm, and 650 nm) were incident according to Process 1 for generating a spectral image;

DETAILED DESCRIPTION OF THE PREFERRED EMBODIMENTS

Preferred embodiments will be described with reference to the accompanying drawings.

Figure 1:
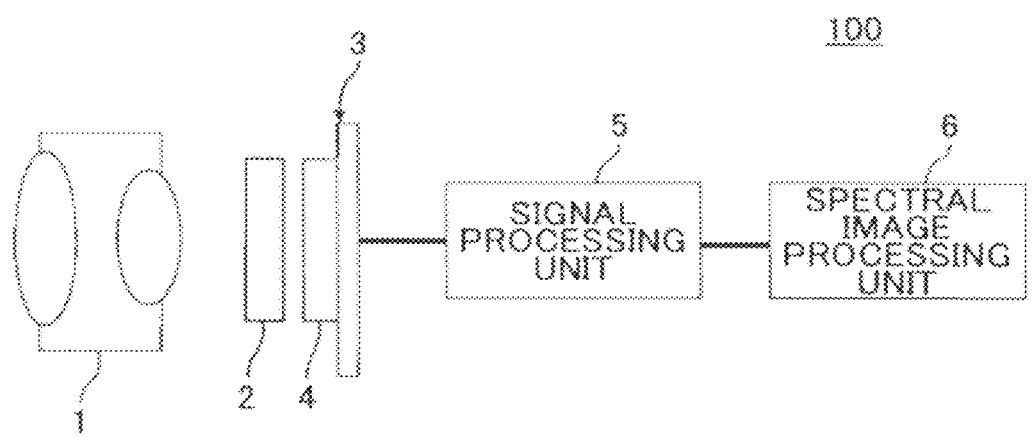
FIG. 1 is a block diagram of an imaging apparatus according to an embodiment of the present invention.

FIG. 1 illustrates an imaging apparatus (spectral image acquiring apparatus) 100 according to an embodiment. The imaging apparatus 100 mainly includes an imaging lens 1, an optical filter 2, a sensor substrate 3 including an image sensor 4 with a two-dimensional pixel array, a signal processing unit 5 that generates acquired image data by converting an analog electric signal output from the sensor substrate 3 into a digital electric signal, and a spectral image processing unit 6 that generates spectral image data from the acquired image data output from the signal processing unit 5. Light from an imaged area including a subject (or specimen) is passed through the imaging lens 1 and the optical filter 2 and then converted into an electric signal by the image sensor 4 depending on the intensity of the light. The signal processing unit 5 converts the electric signal (analog signal) from the image sensor 4 into a digital signal indicating the brightness (luminance) of each of the pixels on the image sensor 4. The signal processing unit 5 may output the digital signal as acquired image data to the subsequent unit, together with horizontal and vertical synchronization signals. The details of the image process performed by the spectral image processing unit 6 will be described later.

Figure 2:
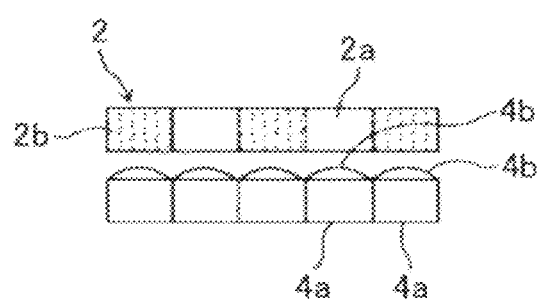
FIG. 2 is an enlarged view of an optical filter and an image sensor of the imaging apparatus.
Figure 3:
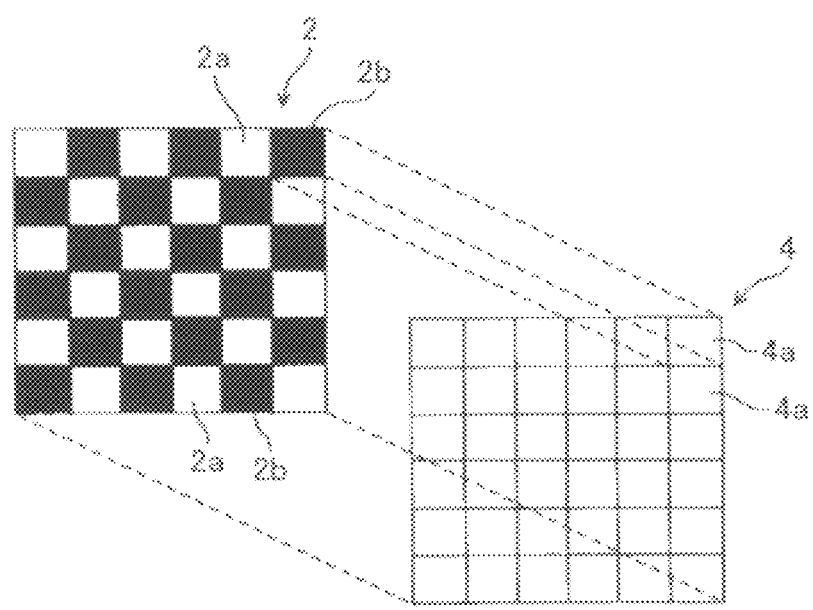
FIG. 3 illustrates the relationship between a lattice pattern of the optical filter and pixels in the image sensor.

FIG. 2 is an enlarged view of the optical filter 2 and the image sensor 4. The image sensor 4 may include a CCD (Charge Coupled Device) image sensor or a CMOS (Complementary Metal Oxide Semiconductor) image sensor having photodiodes 4a as light-receiving elements. The photodiodes 4a are two-dimensionally arranged in an array corresponding to the pixels. In order to increase the light-collecting efficiency of the photodiodes 4a, a micro lens 4b is disposed on an incident side of each photodiode 4a. The image sensor 4 may be bonded to a PWB (printed wiring board) by wire-bonding, thereby forming the sensor substrate 3. The optical filter 2 is closely disposed on the side of the micro lenses 4b of the image sensor 4. On the side of the optical filter 2 facing the image sensor 4, a lattice pattern (area dividing pattern) is formed in which transmitting areas 2a that transmit light and light-blocking areas 2b that block light are disposed alternately adjacent to one another two-dimensionally in a lattice, thus dividing the areas in a checkered pattern, as illustrated in FIG. 3. The transmitting areas 2a and the light-blocking areas 2b are disposed in such a manner as to correspond to the individual pixels (photodiodes 4a) on the image sensor 4, as illustrated in FIG. 3.

In accordance with the present embodiment, the light that has passed through the transmitting areas 2a of the optical filter 2 is diffracted around into the rear of the light-blocking areas 2b. The phenomenon of diffraction is wavelength-dependent, so that the angle of diffraction increases (i.e., the light beam becomes wider) as the wavelength increases. In accordance with the present embodiment, as will be described later, a spectral image is obtained by utilizing the difference in diffraction angle depending on wavelength.

The optical filter 2 according to the present embodiment may include a glass plate on which the transmitting areas 2a and the light-blocking areas 2b are formed. Preferably, the period of the lattice pattern may correspond to one to ten wavelengths in order to produce diffraction intended by the present embodiment. When the image sensor 4 has a pixel size on the order of several micrometers, the periods of the lattice pattern may correspond to one pixel. It goes without saying that a lattice width of the lattice pattern may not correspond to the width of the pixel size of the image sensor 4 on a one-to-one basis and instead they may correspond to each other on a 1-to-M basis. For example, the width of a lattice area may correspond to the width of M pixels. Further, the lattice pattern of the optical filter 2 is not limited to a two-dimensional periodic structure but may include a one-dimensional periodic structure.

The structure of the optical filter 2 is not limited to the one in which the transmitting areas 2a and the light-blocking areas 2b are arranged in a lattice. Preferably, instead of the light-blocking areas 2b that completely block light, polarization areas that block only a specific polarization component may be used. For example, a polarization area that functions as a polarizer that transmits the P polarization component but blocks the S polarization component is used. When such polarization areas are formed instead of the light-blocking areas 2b in the optical filter 2, the S polarization component of the light that is transmitted by the optical filter 2 is blocked by the polarization areas while being diffracted by the transmitting areas. On the other hand, the P polarization component of the light is entirely transmitted by all of the areas of the optical filter 2. The two polarization components (P and S polarization components) perpendicular to each other are merely examples. Any other polarization components having different directions of polarization may be used.

Figure 4:
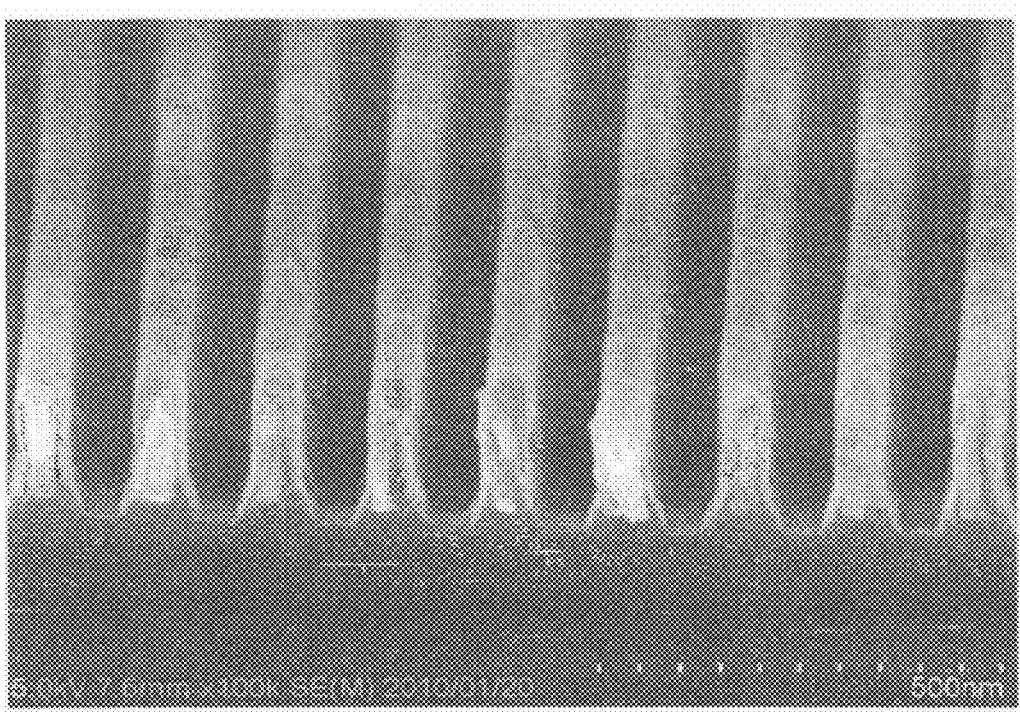
FIG. 4 is an enlarged view of a wire grid polarizer which can be used in polarization areas of the optical filter.

In the case of the optical filter 2 including the transmitting areas and the polarization areas, the polarization areas may include a polarizer made of organic materials utilizing iodine or a dye used in liquid crystal displays, or a wire grid polarizer having high durability. An example of the wire grid polarizer is illustrated in FIG. 4, in which conductive wires made of a metal, such as aluminum, are arranged in a lattice at specific pitches. When the pitch of the wire grid polarizer is sufficiently small compared to the incoming light (such as the visible light wavelengths between 400 and 800 nm), such as one half the incoming light, most of the light of an electric field vector component that oscillates parallel to the conductive wires can be reflected, while most of the light of an electric field vector component orthogonal to the conductive wires can be transmitted. Thus, the wire grid polarizer may be used as a polarizer for producing single polarization.

The wire grid polarizer illustrated in FIG. 4 may be manufactured by a well-known semiconductor process involving pattering after vapor-deposition of an aluminum thin-film, and subsequent forming of a sub-wavelength concave-convex wire grid structure of wire grids by metal etching, for example. The lattice pattern according to the present embodiment may be formed by one of the following two methods. In one method, the wire grid portions are removed from a uniform wire grid layer in accordance with the lattice pattern. In the other method, the lattice pattern and the concave portions of the wire grid are formed at once after uniformly vapor-depositing aluminum. The latter method may have a smaller number of steps.

When a wire grid polarizer is used, the extinction ratio may increase as the cross-sectional area of the metal wire is increased. Further, the transmission factor may be decreased when the width of the metal wire exceeds a predetermined width with respect to the width of the period. When the cross section of the metal wire perpendicular to the longitudinal direction of the wire is tapered, dispersion of transmission factor or polarization degree with respect to wavelength may be reduced in a wide band, thereby exhibiting high extinction ratio characteristics. Preferably, the wire grid polarizer may be sealed with a resin or the like for enhancing abrasion resistance or antifouling property of the surface on which the metal wires are disposed.

EXAMPLE 1

Figure 5:
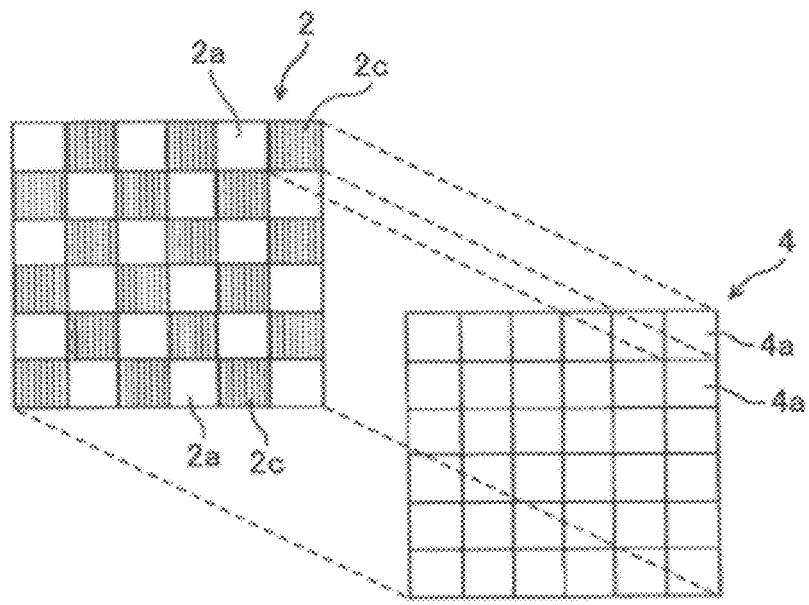
FIG. 5 illustrates the optical filter according to Example 1.

The optical filter 2 according to Example 1 will be described with reference to FIG. 5. The optical filter 2 includes the transmitting areas 2a that transmit both the P and S polarization components and polarization areas 2c that transmit the P polarization component but block the S polarization component. The transmitting areas 2a and the polarization areas 2c are arranged in a lattice such that they are alternately adjacent one another in two-dimensional directions, thus forming a lattice pattern divided into checkered areas. The period (lattice width) of the lattice pattern corresponds to the pitch of the pixels of the image sensor 4.

Figure 6:
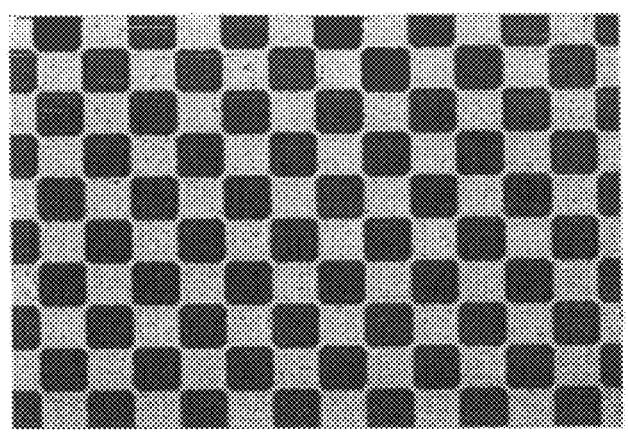
FIG. 6 illustrates a measurement result obtained when light of the S polarization component was incident on the optical filter according to Example 1.

FIG. 6 illustrates an image indicating a measurement result obtained when light of the S polarization component was incident on a prototype of the optical filter 2 according to Example 1 prepared by the present inventors. The prototype optical filter 2 included a glass plate on which areas with wire grids and areas without wire grids were formed such that a single lattice size was approximately 6 μm. The areas with the wire grids correspond to the polarization areas 2c, and the areas without the wire grids correspond to the transmitting areas 2a. The measurement was performed by attaching a monochrome luminance camera to the back surface of the optical filter 2 (emerging plane), irradiating the optical filter 2 with light of the S polarization component, and then taking a picture of the light that has passed through the optical filter 2 with the monochrome luminance camera. As illustrated in FIG. 6, the black portions correspond to the areas in which the light was blocked. Thus, it can be seen that the light of the S polarization component was successfully cut by the polarization areas 2c with the wire grids.

EXAMPLE 2

Figure 7:
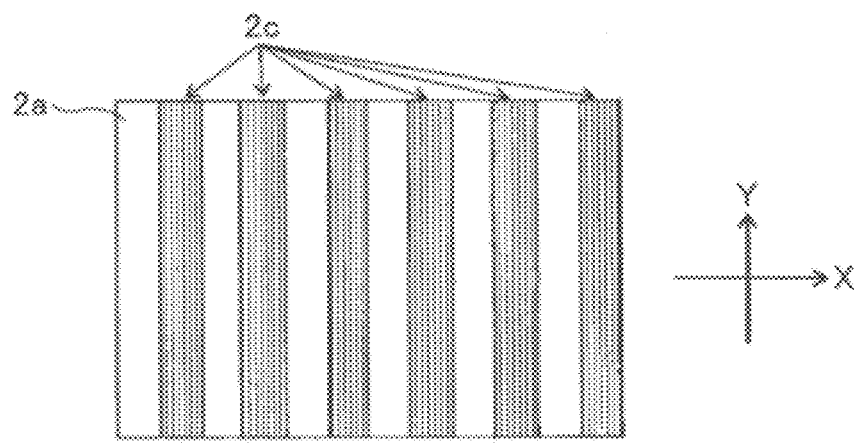
FIG. 7 illustrates the optical filter according to Example 2.

Next, the optical filter 2 according to Example 2 will be described with reference to FIG. 7. The optical filter 2 includes the transmitting areas 2a that transmit both the P and S polarization components, and the polarization areas 2c that transmit the P polarization component but that block the S polarization component. The transmitting areas and the polarization areas 2c are arranged in a lattice such that they are alternately adjacent to one another in a one-dimensional direction, thereby forming a lattice pattern that is divided into striped areas. The period (lattice width) of the lattice pattern corresponds to the pixel pitch of the image sensor 4. In the case of the optical filter 2 having such a striped lattice pattern, positional adjustment with respect to the image sensor 4 may be performed only in the X direction. Thus, compared with the optical filter 2 having the checkered lattice pattern, required implementation accuracy may be lowered.

Figure 8:
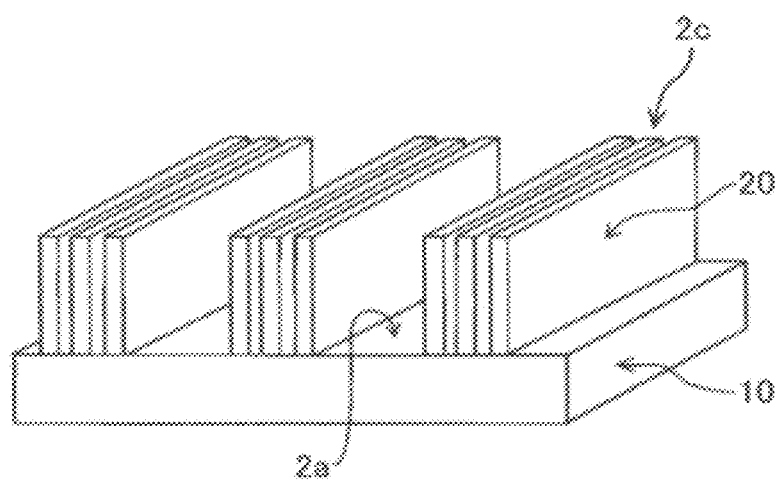
FIG. 8 is an enlarged perspective view of the optical filter according to Example 2.

FIG. 8 is an enlarged perspective view of the optical filter 2 according to Example 2. The optical filter 2 according to Example 2 includes a glass plate 10 on which wire grids 20 are formed. Thus, the optical filter 2 has a periodic concave/convex structure of which the convex portions include a sub-wavelength concave/convex structure of the wire grids 20.

Figure 9:
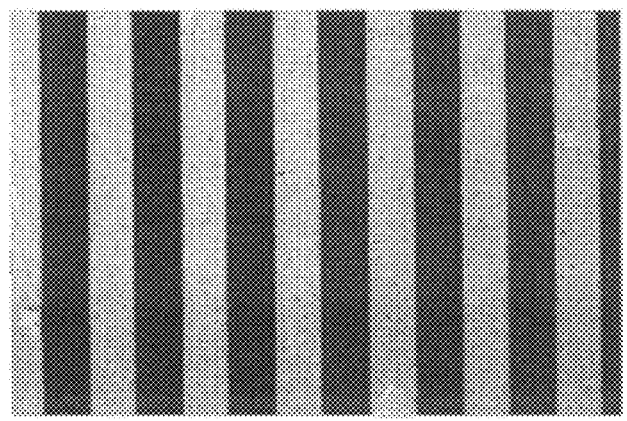
FIG. 9 is an image illustrating a measurement result obtained when light of the S polarization component was incident on the optical filter according to Example 2.

FIG. 9 illustrates an image indicating a measurement result obtained when light of the S polarization component was incident on a prototype of the optical filter 2 prepared by the present inventors according to Example 2. The prototype optical filter 2 included a glass plate on which areas with the wire grids and areas without the wire grids were formed in stripes having a stripe width of approximately 6 μm. The areas with the wire grids correspond to the polarization areas 2c, and the areas without the wire grids correspond to the transmitting areas 2a. The measurement was performed similarly to the measurement for Example 1. As illustrated in FIG. 9, the black portions indicate the areas that blocked the light. Thus, it can be seen that the light of the S polarization component was successfully cut by the polarization areas 2c having the wire grids.

EXAMPLE 3

Figure 10:
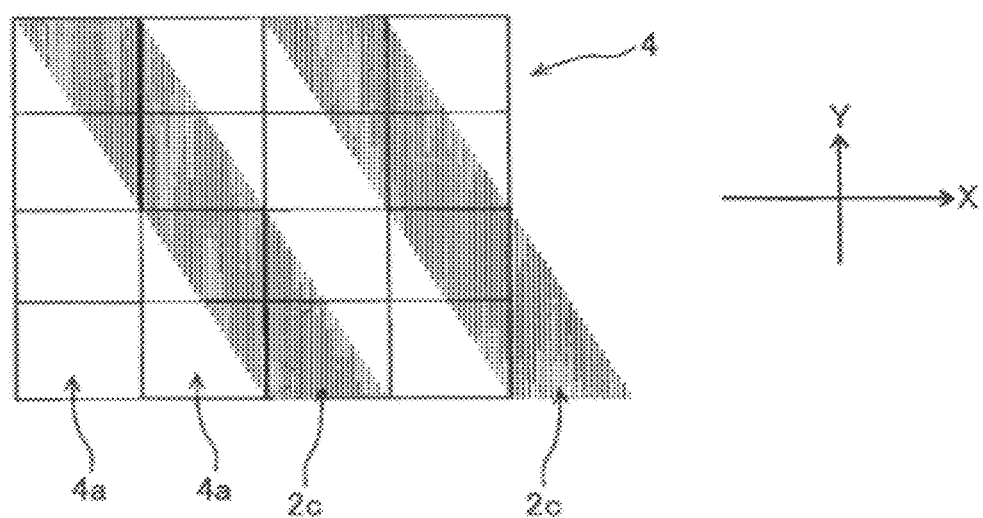
FIG. 10 illustrates polarization areas of the optical filter according to Example 3 superposed on the image sensor.

Next, the optical filter 2 according to Example 3 will be described. FIG. 10 illustrates the polarization areas 2c of the optical filter 2 according to Example 3 superposed on the image sensor 4.

The optical filter 2 according to Example 3 is similar to the optical filter 2 according to Example 2 in that both include a lattice pattern that is divided into striped areas such that the transmitting areas 2a and the polarization areas 2c are arranged alternately adjacent one another one-dimensionally in a lattice. In Example 2, the longitudinal direction of the polarization areas 2c is aligned with the direction of the rows of pixels in the Y direction. In contrast, according to Example 3, the longitudinal direction of the polarization areas 2c is not aligned with either the direction of the rows of pixels arranged in the Y direction or the direction of the rows of pixels arranged in the X direction.

In the optical filter 2 according to Example 3, each of the polarization areas 2c, as illustrated in FIG. 10, has a width corresponding to one pixel of the image sensor 4 in the X direction, and a width corresponding to two pixels of the image sensor 4 in the Y direction. More specifically, the polarization areas 2c are disposed diagonally with respect to the X direction and Y direction on the image sensor 4 such that the position of the polarization areas 2c is displaced by two pixels in the Y direction for a displacement of one pixel in the X direction. By combining the specific lattice pattern and signal processing, a transmission image of the optical filter can be reproduced in an entire screen even when the positioning accuracy in coupling the pixel arrangement of the image sensor 4 with the optical filter 2 is low, thus enabling a decrease in cost.

Figure 11:
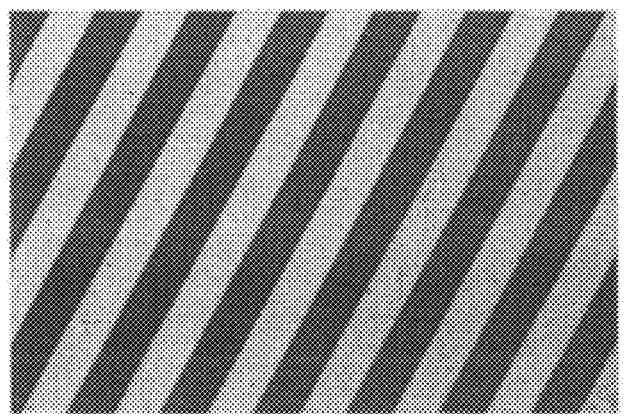
FIG. 11 illustrates an image obtained when light of the S polarization component was incident on the optical filter according to Example 3.

FIG. 11 illustrates an image indicating a measurement result obtained when light of the S polarization component was incident on a prototype of the optical filter 2 prepared by the present inventors according to Example 3. The prototype optical filter 2 included a glass plate on which areas with wire grids and areas without wire grids were formed in stripes having a stripe width of approximately 6 µm. The areas with the wire grids correspond to the polarization areas 2c, and the areas without the wire grids correspond to the transmitting areas 2a. The measurement was performed similarly to the case of Example 1. As illustrated in FIG. 11, the black portions indicate the areas that blocked the light. Thus, it can be seen that the light of the S polarization component was successfully cut by the polarization areas 2c in which the wire grids was formed.

The optical filter 2 according to the present embodiment including Examples 1, 2, and 3 is disposed in a stage prior to the image sensor 4. For example, the optical filter 2 is fixedly disposed with its concave/convex structured surface positioned opposite the light-receiving surface of the image sensor 4. In a memory element of fixing the optical filter 2, a spacer may be disposed around the light-receiving surface of the image sensor 4 in order to retain the optical filter 2. Alternatively, the optical filter 2 may be adhesively bonded to the image sensor 4 by filling the gap between the concave/convex structured surface of the optical filter 2 and the light-receiving surface of the image sensor 4 with an adhesive. In the latter method, because the gap between the optical filter 2 and the image sensor 4 is filled with the adhesive, a structure having a high aspect ratio may be needed in order to provide the same level of transmission factor performance as when the gap is filled with an air layer, resulting in a more difficult manufacturing process. Thus, the former method may be more preferable.

The optical filter 2 may be attached to the image sensor 4 by various methods. In one method, the optical filter 2 may be fixed onto the sensor substrate 3 including a PWB on which the image sensor 4 is mounted by wire-bonding, thereby forming an assembly (ASSY). In another method, the optical filter 2 may be fixedly attached to the image sensor 4 in advance and then the fixed components may be mounted on a PWB. Preferably, a wafer of the image sensors 4 and a wafer on which the optical filters 2 are formed may be bonded to each other and then processed by dicing. In this way, manufacturing cost can be reduced.

Process 1 for Generating a Spectral Image

Next, a process 1 for generating a spectral image according to the present embodiment will be described with reference to an example in which the optical filter 2 includes the checkered lattice pattern in which the transmitting areas 2a and the light-blocking areas 2b are arranged in a lattice such that they are alternately adjacent one another in two-dimensional directions.

FIGS. 12A, 12B, and 12C illustrate enlarged views of a part of images ("RAW" images) output from the signal processing unit 5 when light of three single wavelengths (450 nm, 550 nm, and 650 nm) were incident on the optical filter 2.

In the illustrated example, the divided areas of the lattice (transmitting areas 2a and light-blocking areas 2b) of the optical filter 2 correspond to the pixels of the image sensor 4 on a one-to-one basis. Thus, the bright/dark pattern in the acquired image is a repeated pattern of pixel units. As illustrated in FIGS. 12A, 12B, and 12C, the contrast of the bright/dark pattern of the acquired image is varied depending on the wavelength of the incident light. The three single wavelengths of light (450 nm, 550 nm, and 650 nm) were obtained by passing white light through commercially available bandpass filters. The bandpass filters had the central wavelengths of 650 nm, 550 nm, and 450 nm, and each had a transmission wavelength width of ±40 nm.

The difference in contrast of the bright/dark patterns of the acquired images depending on the wavelength of the incident light may be due to the type of the lattice pattern of the optical filter 2, or the optical characteristics determined by the arrangement of the optical filter 2 and the image sensor 4, for example. The "optical characteristics" herein may be due to various factors, such as the spectral transmittance of the optical filter 2 or scattering. Mainly, however, the optical characteristics are strongly influenced by the phenomenon of diffraction caused by the lattice pattern of the optical filter 2. Specifically, due to the diffraction phenomenon, a beam that has passed through a particular transmitting area 2a spreads and is received not only by the pixel corresponding to the particular transmitting area 2a but also by an adjacent pixel. The diffraction phenomenon is wavelength-dependent such that the angle of diffraction tends to be increased as the wavelength is increased. Thus, the amount of light received by the adjacent pixel increases as the wavelength of the light that is passed through the particular transmitting area 2a becomes longer, while the amount of light received by the pixel corresponding to the particular transmitting area 2a is reduced. Thus, the longer the wavelength of the light that is passed through the transmitting area 2a, the smaller the difference is between the amount of light (luminance value) received by the pixel corresponding to the particular transmitting area 2a and the amount of light received by the pixel corresponding to the light-blocking area 2b adjacent the particular transmitting area, thus resulting in a smaller contrast value.

FIGS. 13A, 13B, and 13C are histograms indicating the amount of light (luminance value) received by the pixels on the image sensor 4 when the three single wavelengths of light (450 nm, 550 nm, and 650 nm) were incident on the image sensor 4.

As illustrated in FIGS. 13A, 13B, and 13C, the histograms exhibit peaks at a luminance value (lower luminance value) of the pixels corresponding to the light-blocking areas 2b (pixels at dark portions) and a luminance value (higher luminance value) of the pixels (pixels at the bright portions) corresponding to the transmitting areas 2a. However, the difference in luminance between the peaks is varied depending on the wavelength of the light that has passed through the optical filter 2. Specifically, it is seen that the longer the wavelength of the light that has passed through the transmitting areas 2a, the smaller the luminance difference between the two peaks.

When the bright portions have a luminance value I1 and the dark portions have a luminance value I2, a difference value (I1−I2) may be used as an index value of the contrast between the bright portions and the dark portions. In the present example, the difference value is divided by a total luminance value (I1+I2) in order to obtain a contrast index value Ic, as indicated below.

$$Ic=(I1-I2)/(I1+I2) \quad (1)$$

Figure 14:
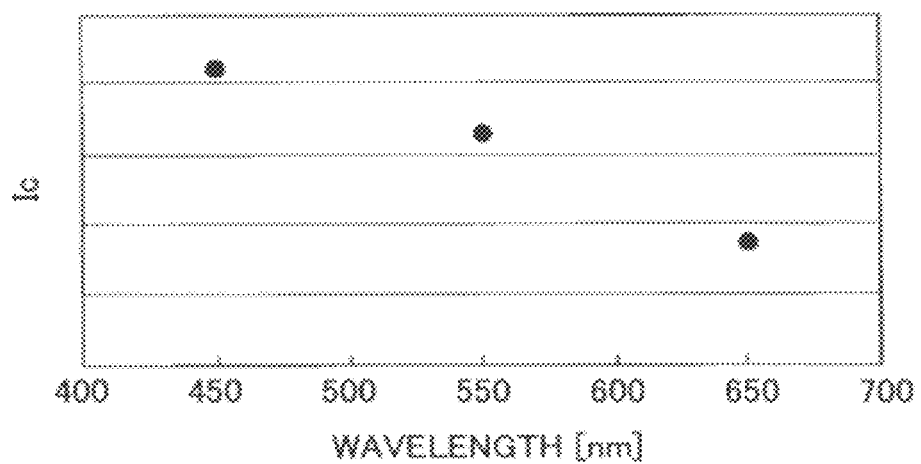
FIG. 14 is a graph plotting a contrast index value Ic of an acquired image obtained when the three single wavelengths of light (450 nm, 550 nm, and 650 nm) were incident according to Process 1 for generating a spectral image.

FIG. 14 is a graph plotting the contrast index value Ic of the images obtained when the three single wavelengths of light (450 nm, 550 nm, 650 nm) were incident.

As illustrated in FIG. 14, the contrast index value Ic exhibits wavelength-dependency. Thus, the wavelength of the light incident on the pixels can be calculated by calculating the contrast index value Ic, which indicates the luminance difference value between the pixels corresponding to the bright portions and the pixels corresponding to the dark portions.

In accordance with the present embodiment, a combination of any two adjacent pixels corresponds to a combination of the bright portion and the dark portion. Thus, by calculating the contrast index value Ic of two adjacent pixels, the wavelength of the light incident on the two adjacent pixels can be determined. Therefore, by calculating the contrast index values Ic of two adjacent pixels in the entire acquired image, and then allocating the contrast index values Ic to the positions of the corresponding two adjacent pixels, a two-dimensional distribution of the contrast index values Ic can be created. In the two-dimensional distribution, the wavelength components of the various points within the imaged area are associated with the corresponding points. The two-dimensional distribution may be represented by an image (difference-value image) representing the differences in the contrast index values Ic by differences in gradation, and the image may be used as a spectral image.

Process 2 for Generating a Spectral Image

Next, a process 2 for generating a spectral image according to the present embodiment is described. In this example, the optical filter 2 has the checkered lattice pattern in which the transmitting areas 2a and the polarization areas 2c are arranged in a lattice such that they are disposed alternately adjacent to one another in two-dimensional directions.

In the above process 1 for generating a spectral image, the contrast index value is determined by equation (1), i.e., Ic= (I1−I2)/(I1+I2). In accordance with process 2 for generating a spectral image, a contrast index value SPc is calculated by the following equation.

$$SPc=(S-P)/(S+P) \quad (2)$$

where "P" is a transmission intensity of the P polarization component and "S" is a transmission intensity of the S polarization component. Specifically, "P" is the luminance value of the pixels corresponding to the polarization areas 2c that transmit the P polarization component but that block the S polarization component. On the other hand, "S" indicates the transmission intensity of the S polarization component, which is obtained by subtracting P, i.e., the luminance value P of the pixels corresponding to the polarization areas 2c, from the luminance value of the pixels corresponding to the transmitting areas 2a.

Figure 15:
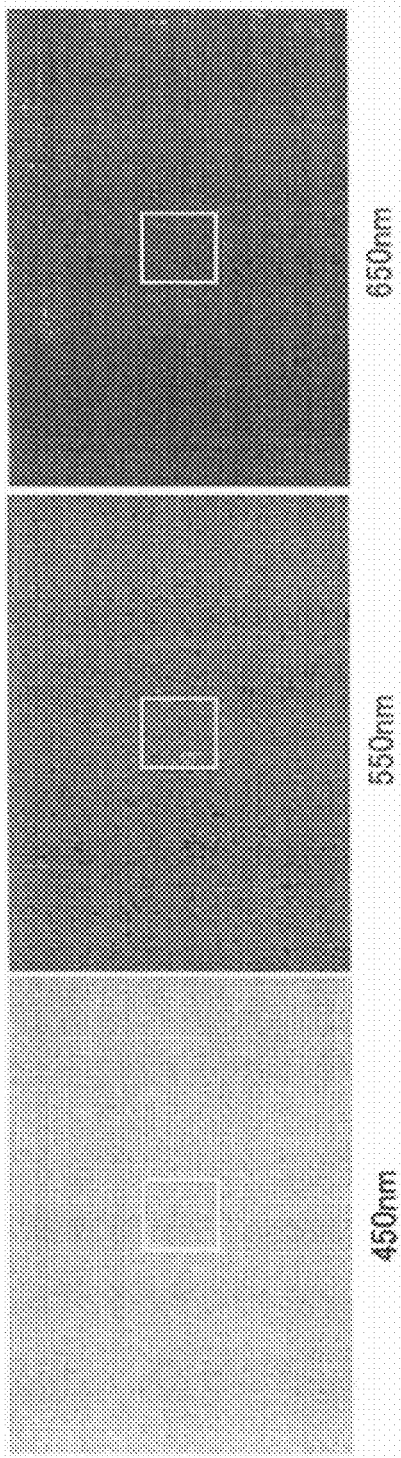
FIGS. 15A, 15B, and 15C illustrate entire acquired images output from the signal processing unit where the three single wavelengths of light (450 nm, 550 nm, and 650 nm) were incident according to Process 2 for generating an image.
Figure 16:
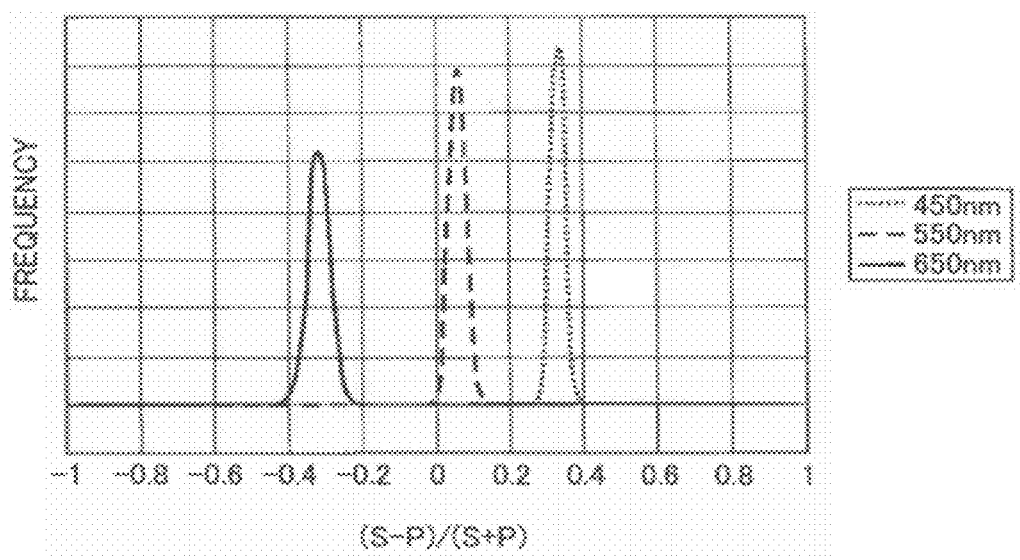
FIG. 16 is a histogram illustrating the result of measuring the distribution of the contrast index values SPc with respect to portions enclosed by white lines in FIGS. 15A, 15B, and 15C.

FIGS. 15A, 15B, and 15C illustrate images (parts of a "RAW" image) output from the signal processing unit 5 where the three single wavelengths of light (450 nm, 550 nm, and 650 nm) were incident on the optical filter 2. FIG. 16 is a histogram indicating the result of measuring the distribution of the contrast index values SPc=(S−P)/(S+P) with respect to the portions enclosed by white lines in FIGS. 15A, 15B, and 15C. As illustrated in FIG. 16, the contrast index value SPc is wavelength-dependent. Specifically, the contrast index value SPc tends to be shifted in the minus direction as the wavelength is increased. Therefore, the wavelength of the light incident on two adjacent pixels can be determined by calculating the contrast index value SPc based on the luminance value of the two adjacent pixels. Thus, by calculating the contrast index value SPc of two adjacent pixels for the entire acquired image, and then assigning the contrast index values SPc to the positions corresponding to the two adjacent pixels, a two-dimensional distribution of the contrast index values SPc can be created. In the two-dimensional distribution, the wavelength components of the various points within the imaged area are associated with the respective points. By representing the two-dimensional distribution in an image (difference-value image) representing the differences in the contrast index value SPc by differences in gradation, the image can be used as a spectral image.

In the histogram illustrated in FIG. 16, the contrast index value SPc is indicated within a range between −1 and +1. Preferably, when the contrast index value SPc is to be represented by 256 gradation levels in an actual output image, a spectral image of 256 gray scale levels can be obtained by representing the gray level of +1 as black and the gray level of −1 as white in the histogram. By observing such a spectral image, a spectral state (i.e. a two-dimensional distribution of wavelengths) of the imaged area can be recognized as visible information. Preferably, the contrast index values SPc may be represented by a color table depending on the wavelength as described above.

Figure 17:
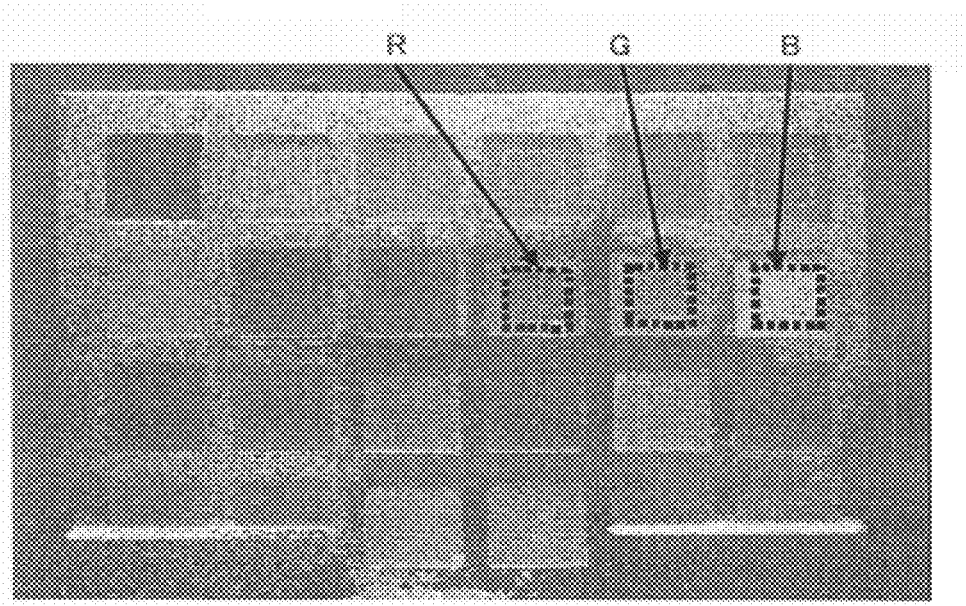
FIG. 17 is a spectral image obtained based on the contrast index value SPc calculated by taking a picture of a commercially available color chart.
Figure 18:
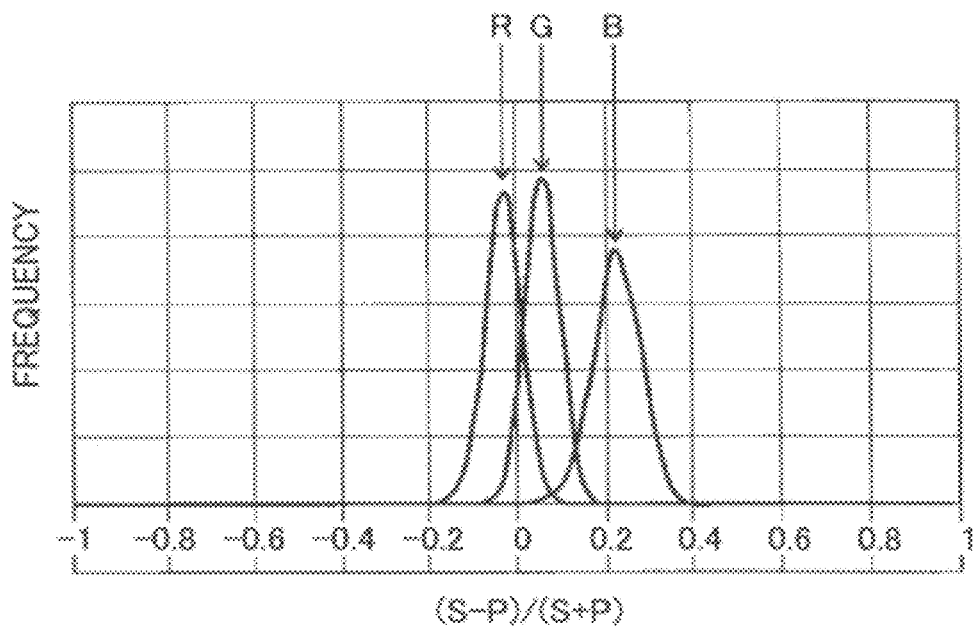
FIG. 18 is a histogram illustrating the result of measuring the distribution of the contrast index values SPc with respect to portions R, G, and B illustrated in FIG. 17.

FIG. 17 illustrates a spectral image obtained by taking a picture of a commercially available color chart with the imaging apparatus according to the present embodiment and then calculating the contrast index value SPc. In FIG. 17, "R" indicates a red portion, "G" indicates a green portion, and "B" indicates a blue portion. FIG. 18 is a histogram indicating the result of measuring a distribution of the contrast index value SPc=(S−P)/(S+P) with respect to the portions R, G, and B in FIG. 17.

It is seen that, in the spectral image illustrated in FIG. 17, differences in color (i.e., differences in wavelength) are represented by differences in gradation. It is also seen from the histogram of FIG. 18 that the contrast index value SPc is varied depending on the difference in color (difference in wavelength). Thus, the image illustrated in FIG. 17, which represents the difference in the contrast index value SPc calculated based on the luminance value of the two adjacent pixels by differences in gradation, can be used as a spectral image that two-dimensionally represents the wavelength components of points within a predetermined imaged area in association with the points.

Thus, in the spectral image acquiring apparatus according to the present embodiment, the two-dimensional distribution of wavelengths in an imaged area can be acquired as an image (spectral image), so that a spectral image can be obtained by a single imaging operation. Further, the spectral image can be obtained by simply calculating the contrast index value Ic or SPc based on the difference in luminance value between adjacent pixels. Thus, processing workload and time can be reduced compared to an image process involving the composition of plural items of image data. As a result, a spectral image can be captured at higher speeds than according to conventional technologies.

In addition, in accordance with the present embodiment, the spectral image can be captured by only using static mechanisms, i.e., without using dynamic mechanisms whose operations need to be controlled during the capturing of the spectral image, such as transporting units including a scan mechanism, and active devices including a liquid crystal device. Thus, an imaging apparatus which is highly reliable in terms of resistance to weather, vibration, and so on can be realized. Further, the present embodiment can be realized without using a drive circuit for driving an active device, so that an inexpensive and simple configuration can be realized. Accordingly, a spectral image can be captured with a smaller configuration than that of conventional technologies.

Particularly, as described above with reference to Examples 1 through 3, when the optical filter 2 has a lattice pattern including the transmitting areas 2a and the polarization areas 2c in which wire grid polarizers are formed, the contrast index value Ic based on the phenomenon of diffraction and the contrast index value SPc based on the relationship between the S and P polarization components can be both acquired in a single imaging operation. However, in a scene where polarization information and spectral information are mixed, they may need to be separated and evaluated separately. In such a case, only one of the information may be retrieved and a spectral image may be generated from the retrieved information.

Figure 19:
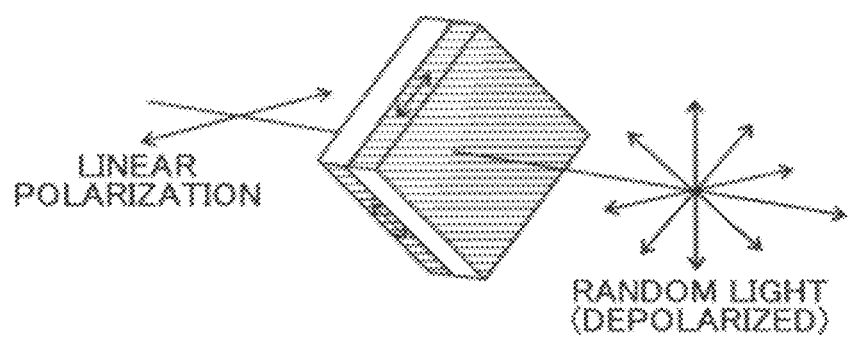
FIG. 19 illustrates an example of a depolarizing plate.

For example, when generating a spectral image exclusively from the spectral information by eliminating the polarization information, a polarizer having grid lines rotated by 45° with respect to the direction of the grid lines formed in the polarization area 2c of the optical filter 2 may be disposed in a stage preceding the imaging lens 1. Alternatively, instead of such a polarizer, a depolarizing plate may be disposed. The depolarizing plate is used for producing a depolarized state from a polarized state. The depolarizing plate may be prepared by affixing two polarizers such that their polarizing axes (i.e., the directions in which polarized light can be transmitted) are perpendicular to each other, as illustrated in FIG. 19.

Conversely, when a spectral image is to be generated exclusively from the polarization information by eliminating the spectroscopic information, a bandpass filter that passes only specific wavelength components may be disposed in a stage preceding the imaging lens 1.

The spectral image acquiring apparatus according to the present embodiment may be used as measuring equipment in various fields and industries, such as food and agriculture, and FA (factory automation) applications.

For example, the spectral image acquiring apparatus according to the present embodiment can be used for agricultural remote sensing purposes for monitoring a growth status of agricultural crops, or for predicting yields. In this case, basic data may be gathered by collecting spectral data from the top-end portions of leaves planted on the farm, and then protein content or yields from the particular position may be sampled. Thereafter, a growth status may be determined based on correlation information with respect to a spectral image acquired from a satellite image.

In another application, the present embodiment may be used for determining the freshness of foodstuff or its taste visually or numerically in a simple manner. Consumers increasingly wish to not only make sure about the safety and quality of foodstuff but also know more information about freshness or taste, including production and distribution technologies. It is known that foodstuff generally provides spectral information mainly in infrared regions. Thus, by preparing a table of spectral information corresponding to foodstuff information or changes in foodstuff states, and then comparing such information with a spectral image acquired by an imaging apparatus according to the present embodiment, specimen information can be output.

In recent years, many vehicles have been equipped with imaging apparatuses for controlling the vehicle or issuing a warning to the driver. A spectral image acquiring apparatus according to the present embodiment may be used as such a vehicle-mounted imaging apparatus. For example, by using a spectral image acquired by the spectral image acquiring apparatus according to the present embodiment, spectral differences can be recognized among an approaching car, a preceding car, and other reflecting bodies or light-emitting bodies. Thus, by identifying the type of each light source, the vehicle may be controlled to illuminate an object other than the approaching or preceding car with head lights. Namely, the spectral image acquiring apparatus according to the present embodiment may be used for controlling head lights of a vehicle at night.

Further, production line automation has also been advancing in recent years. One example is a technology that enables a robot arm to recognize and identify various types of components transported on a line and pick certain types of components. Components with the same shape but different colors cannot be distinguished by monochrome images alone. Such components can be classified by using a spectral image acquiring apparatus according to the present embodiment.

Thus, in the spectral image acquiring apparatus according to the present embodiment, in order to acquire a spectral image that two-dimensionally represents wavelength components at respective points within a predetermined imaged area in association with the respective points, light from the predetermined imaged area is detected by the image sensor 4 having a two-dimensionally arranged pixel array via the optical filter 2, and a detection result is output from the apparatus. The optical filter 2 includes a diffraction grating having a lattice pattern corresponding to unit areas including one or more pixels (which may include a number of pixels linearly arranged in the Y direction, or a number of pixels linearly arranged in a diagonal direction) on the image sensor 4. The lattice width or the distance between the optical filter 2 and the image sensor 4 may be set such that the difference value (luminance difference value) in the received amounts of light I1 and I2 between two adjacent unit areas is varied based on the differences in the point of interference on the image sensor 4 corresponding to the diffraction angle of the light that has passed through the diffraction grating.

In the spectral image acquiring apparatus according to the present embodiment, the contrast index value Ic=(I1−I2)/(I1+I2) corresponding to the luminance difference value between the two adjacent unit areas is calculated based on a result of detection by an image sensor, and a difference-value image is output which is based on the contrast index value Ic (i.e., an image representing the difference in the contrast index value Ic between the two adjacent unit areas in terms of differences in gradation). As described with reference to Process 1 for generating a spectral image, in the difference-value image that is output, the two-dimensional distribution of the contrast index values Ic corresponds to the wavelength components of points within the imaged area, where the wavelength components are associated with the respective points. Thus, a difference-value image representing the difference in the contrast index value Ic by differences in gradation, for example, can be used as a spectral image.

Preferably, the optical filter 2 may include a diffraction grating having a lattice pattern in which the polarization areas 2c that block a predetermined polarization component, i.e., the S polarization component, and the transmitting areas 2a that transmit the S polarization component are disposed alternately. In this case, the contrast index value Spc is calculated based on the detection result from the image sensor 4 according to SPc=(S−P)/(S+P) indicating a difference value between the amount of received light P of the P polarization component received by unit areas corresponding to the polarization areas 2c and the amount of received light S received by adjacent unit areas. Based on the calculated contrast index value SPc, a difference-value image (that represents the difference in the contrast index value SPc between the two adjacent unit areas by difference in gradation) is output. As described above with reference to Process 2 for generating the spectral image, in the difference-value image that is output, the two-dimensional distribution of the contrast index value SPc corresponds to the wavelength components of the points within the imaged area in association with the respective points. Thus, the difference-value image representing the difference in the contrast index value SPc by the difference in gradation can be used as a spectral image.

Further, in accordance with the present embodiment, the optical filter 2 may include a diffraction grating in which the polarization areas 2c are formed by a polarizer in which wire grids having a number of grooves extending in the direction of polarization of the S polarization component are arranged in a direction perpendicular to the polarization direction. In this case, a spectral image can be obtained in which both polarization information and spectral information are reflected. However, when it is desired to generate a spectral image exclusively from the spectral information by eliminating the polarization information, a polarizing member that extends in a direction inclined with respect to the direction in which the wire grids extend (i.e., the polarizing direction of the S polarization component) by 45° may be disposed on the optical path. Alternatively, a depolarizing member may be disposed on the optical path.

Thus, in accordance with an embodiment, there is provided a spectral image acquiring apparatus capable of acquiring a spectral image in a short processing time.

Although this invention has been described in detail with reference to certain embodiments, variations and modifications exist within the scope and spirit of the invention as described and defined in the following claims.

The present application is based on Japanese Priority Application No. 2010-241074 filed Oct. 27, 2010, the entire contents of which are hereby incorporated by reference.

What is claimed is:

1. A spectral image acquiring apparatus comprising:
an optical filter on which light from an imaged area is incident;
an image sensor including a two-dimensionally disposed pixel array and configured to detect the light via the optical filter and configured to output a detection signal; and
a signal processing unit configured to process the detection signal from the image sensor and generate a digital signal indicating a luminance of each of pixels on the image sensor, and configured to generate a difference-value image based on the detection signal obtained from a single imaging operation,
wherein the optical filter includes a diffraction grating having a lattice pattern corresponding to unit areas on the image sensor, the unit areas including one or more pixels on the image sensor,
wherein the lattice pattern of the diffraction grating includes an alternate arrangement of a light-blocking area and a light-transmitting area,
wherein the signal processing unit calculates a difference value in an amount of received light between two of the unit areas on the image sensor that are adjacent to each other based on the luminance of the each of the pixels on the image sensor, and generates the difference-value image based on the calculated difference value, and
wherein the difference value between the two adjacent unit areas on the image sensor is varied based on a difference in an interference point on the image sensor corresponding to a diffraction angle of the light that has passed through the diffraction grating.

2. The spectral image acquiring apparatus according to claim 1, wherein the light-blocking area blocks a predetermined polarization component of the light and the light-transmitting area transmits the predetermined polarization component of the light.

3. The spectral image acquiring apparatus according to claim 2, wherein the light-blocking area includes a polarizer in which a number of grooves that extend in a polarization direction of the predetermined polarization component are arranged in a direction perpendicular to the polarization direction.

4. The spectral image acquiring apparatus according to claim 3, further comprising a polarizing member disposed on an optical path of the light,
wherein the polarizing member extends in a direction at an angle of 45° with respect to the direction in which the grooves of the light-blocking area extend.

5. The spectral image acquiring apparatus according to claim 3, further comprising a depolarizing member disposed on the optical path.

6. The spectral image acquiring apparatus according to claim 2, wherein the light-blocking area includes a wire grid polarizer in which conductive wires made of a metal are arranged in a lattice at specific pitches.

7. The spectral image acquiring apparatus according to claim 6, wherein the wire grid polarizer is sealed with a resin.

8. The spectral image acquiring apparatus according to claim 2, wherein the signal processing unit calculates a contrast index value according to the following formula:

$$SPc=(S-P)/(S+P),$$

wherein:
SPc is a contrast index value between two adjacent unit areas on the image sensor;
P is a luminance value of the light-blocking area which transmits a P polarization component and blocks a S polarization component;
S is a value obtained by subtracting P from a luminance value of the light-transmitting area; and
the light-blocking area and the light-transmitting area are the two adjacent unit areas on the image sensor.

9. The spectral image acquiring apparatus according to claim 1, wherein the light-blocking area completely blocks the light and the light-transmitting area transmits the light.

10. The spectral image acquiring apparatus according to claim 9, wherein the difference value between the two of the unit areas on the image sensor that are adjacent to each other is calculated according to the following formula:

$$DV=I1-I2,$$

wherein:
DV is a difference value between two adjacent unit areas on the image sensor;

I1 is a luminance value of a first unit area on the image sensor; and

I2 is a luminance value of a second unit area on the image sensor that is adjacent to the first unit area on the image sensor.

11. The spectral image acquiring apparatus according to claim 10, wherein the first unit area on the image sensor is the light-blocking area, and the second unit area on the image sensor is the light-transmitting area.

12. The spectral image acquiring apparatus according to claim 11, wherein the signal processing unit calculates a contrast index value according to the following formula:

$$Ic=(I1-I2)/(I1+I2),$$

wherein:

Ic is a contrast index value between two adjacent unit areas on the image sensor;

I1 is a luminance value of the first unit area on the image sensor; and

I2 is a luminance value of the second unit area on the image sensor that is adjacent to the first unit area on the image sensor.

13. The spectral image acquiring apparatus according to claim 12, wherein a wavelength of a light incident on the two adjacent unit areas on the image sensor is determined based on the calculated contrast index value.

14. The spectral image acquiring apparatus according to claim 12, wherein the signal processing unit calculates the contrast index value for each of the two adjacent unit areas of the entire imaged area, and generates a two-dimensional distribution of the contract index value for the entire imaged area, which corresponds to the difference-value image of the imaged area.

* * * * *